US007449423B2

(12) United States Patent
Zhou et al.

(10) Patent No.: US 7,449,423 B2
(45) Date of Patent: Nov. 11, 2008

(54) HEAT TREATMENT OF ANCHORED NANOCATALYSTS IN A NON-ZERO OXIDATION STATE AND CATALYSTS MADE BY SUCH METHOD

(75) Inventors: Bing Zhou, Cranbury, NJ (US); Horacio Trevino, Annandale, NJ (US); Zhihua Wu, Plainsboro, NJ (US); Zhenhua Zhou, Lawrenceville, NJ (US); Changkun Liu, Lawrenceville, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 580 days.

(21) Appl. No.: 11/101,209

(22) Filed: Apr. 7, 2005

(65) Prior Publication Data

US 2006/0160695 A1   Jul. 20, 2006

Related U.S. Application Data

(60) Provisional application No. 60/643,836, filed on Jan. 14, 2005.

(51) Int. Cl.
- *B01J 30/00* (2006.01)
- *B01J 37/00* (2006.01)
- *C08F 4/02* (2006.01)
- *C08F 4/60* (2006.01)

(52) U.S. Cl. .................. 502/104; 502/439; 502/107; 502/111; 502/150; 502/173

(58) Field of Classification Search .................. 502/439, 502/150, 104, 107, 111, 173
See application file for complete search history.

(56) References Cited

U.S. PATENT DOCUMENTS

| | | | |
|---|---|---|---|
| 4,148,750 A | 4/1979 | Pine | |
| 4,366,085 A | 12/1982 | Ikegami et al. | |
| 4,379,778 A | 4/1983 | Dalton, Jr. et al. | |
| 4,476,242 A | 10/1984 | Puskas et al. | |
| 4,513,098 A | 4/1985 | Tsao | |
| 4,826,795 A | 5/1989 | Kitson et al. | |
| 4,937,220 A | 6/1990 | Nickols, Jr. | |
| 5,024,905 A | 6/1991 | Itoh et al. | |
| 5,096,866 A | 3/1992 | Itoh et al. | |
| 5,128,114 A | 7/1992 | Schwartz | |
| 5,234,584 A | 8/1993 | Birbara et al. | |
| 5,338,531 A | 8/1994 | Chuang et al. | |
| 5,352,645 A | 10/1994 | Schwartz | |
| 5,378,450 A | 1/1995 | Tomita et al. | |
| 5,480,629 A | 1/1996 | Thompson et al. | |
| 5,496,532 A | 3/1996 | Monzen et al. | |
| 5,505,921 A | 4/1996 | Luckoff et al. | |
| 5,767,036 A | 6/1998 | Freund et al. | |
| 5,846,898 A | 12/1998 | Chuang et al. | |
| 5,851,948 A | 12/1998 | Chuang et al. | |
| 5,859,265 A | 1/1999 | Muller et al. | |
| 5,925,588 A | 7/1999 | Chuang et al. | |
| 5,972,305 A | 10/1999 | Park et al. | |
| 5,976,486 A | 11/1999 | Thompson et al. | |
| 6,054,507 A | 4/2000 | Funaki et al. | |
| 6,090,858 A | 7/2000 | El-Sayed | |
| 6,127,307 A | 10/2000 | Muller et al. | |
| 6,159,267 A | 12/2000 | Hampden-Smith | |
| 6,168,775 B1 | 1/2001 | Zhou et al. | |
| 6,194,338 B1 | 2/2001 | Andolfatto et al. | |
| 6,387,346 B1 | 5/2002 | Bertsch-Frank et al. | |
| 6,391,821 B1 * | 5/2002 | Satoh et al. | 502/300 |
| 6,518,217 B2 | 2/2003 | Xing et al. | |
| 6,528,683 B1 | 3/2003 | Heidemann et al. | |
| 6,534,661 B1 * | 3/2003 | Zhou et al. | 549/531 |
| 6,551,960 B1 | 4/2003 | Laine et al. | |
| 6,676,919 B1 | 1/2004 | Fischer et al. | |
| 6,740,615 B2 | 5/2004 | Zhou | |
| 6,746,597 B2 | 6/2004 | Zhou et al. | |

(Continued)

FOREIGN PATENT DOCUMENTS

WO    WO 02/83550    10/2002

OTHER PUBLICATIONS

Ahmadi, et al., "Shape-Controlled Synthesis of Colloidal Platinum Nanoparticles" *Science*, vol. 272, pp. 1924-1926 (Jun. 28, 1996).

(Continued)

*Primary Examiner*—Jerry Lorengo
*Assistant Examiner*—Noah S Wiese
(74) *Attorney, Agent, or Firm*—Workman Nydegger

(57) ABSTRACT

A catalyst manufacturing process includes heat treating an intermediate catalyst composition that includes catalyst nanoparticles having catalyst atoms in a non-zero oxidation state bonded to a dispersing/anchoring agent. The catalyst nanoparticles are formed using a dispersing agent having at least one functional group selected from the group of a hydroxyl, a carboxyl, a carbonyl, an amide, an amine, a thiol, a sulfonic acid, sulfonyl halide, an acyl halide, an organometallic complex, and combinations of these. The dispersing agent can be used to form single- or multicomponent supported nanocatalysts. The dispersing agent also acts as an anchoring agent to firmly bond the nanocatalyst to a support. Performing the heat treating process in an inert or oxidative environment to maintain the catalyst atoms in a non-zero oxidation helps maintains a stronger bonding interaction between the dispersing agent and the catalyst atoms. This, in turn, increases the dispersion and/or distribution of catalyst components throughout the supported catalyst.

24 Claims, No Drawings

U.S. PATENT DOCUMENTS

| | | | |
|---|---|---|---|
| 7,045,479 B2* | 5/2006 | Zhou et al. | 502/125 |
| 2004/0013601 A1 | 1/2004 | Butz et al. | |
| 2004/0037770 A1 | 2/2004 | Fischer et al. | |
| 2004/0087441 A1* | 5/2004 | Bock et al. | 502/313 |
| 2004/0102648 A1* | 5/2004 | Borgmeier et al. | 562/546 |
| 2004/0241502 A1 | 12/2004 | Chung et al. | |

OTHER PUBLICATIONS

Li, et al., "Carbon Nanotubes as Support for Cathode Catalyst of a Direct Methanol Fuel Cell", *Letters to the Editor/Carbon 40*, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells", *J. Phys. Chem*, B, vol. 107, pp. 6292-6299 (Jun. 6, 2003).

Lordi, et al., "Method for Supporting Platinum on Single-Walled Carbon Nanotubes for a Selective Hydrogenation Catalyst", *Chem. Mater.*, vol. 13, pp. 733-737 (Feb. 10, 2001).

Zhou, et al., "Novel Synthesis of Highly Active Pt/C Cathode Electrocatalyst for Direct Methanol Fuel Cell" Chem. Commun. 2003, pp. 394-395.

Zhou, et al. "Preparation and Characterization of Anode Catalysts PtRu/C for Direct Methanol Fuel Cells" Chemical Journal of Chinese Universities, vol. 24, 2003, pp. 885-862.

\* cited by examiner

HEAT TREATMENT OF ANCHORED NANOCATALYSTS IN A NON-ZERO OXIDATION STATE AND CATALYSTS MADE BY SUCH METHOD

CROSS-REFERENCE TO RELATED APPLICATIONS

This application claims the benefit of earlier filed U.S. Provisional Application No. 60/643,836, filed Jan. 14, 2005, the disclosure of which is incorporated herein in its entirety.

BACKGROUND OF THE INVENTION

1. The Field of the Invention

The present invention relates generally to improved methods for manufacturing supported catalysts and catalysts made by such methods. Anchored nanocatalyst particles are at least partially maintained in a non-zero oxidation state to increase anchoring strength, catalyst particle stability, and particle dispersion during a heat treatment process.

2. The Relevant Technology

It is sometimes desirable to subject catalysts to a heat treatment process (sometimes referred to as "calcining") in order to drive off solvents and unwanted organic compounds that may inhibit catalytic activity and/or to help coalesce metal catalyst atoms to form solid catalyst particles or crystals. This is particularly true of catalysts that are attached to a solid support using solvents or other materials that are not intended to remain with the catalyst during use. Supported and anchored reforming nanocatalysts are an example of a catalyst that works better when initially subjected to a heat treatment process (e.g., in terms of activity, selectivity, longevity and/or hydrogen production).

One problem associated with subjecting catalyst particles, including supported catalysts, to elevated temperature is the tendency of metal catalyst particles to become unstable, migrate and agglomerate together. Causing or allowing catalyst particles to agglomerate together decreases the overall surface area of the catalyst material and reduces catalyst distribution on the support surface. Because catalytic activity is proportional to both the surface area and distribution of the catalyst, excessive heat treatment can decrease catalytic activity, thus potentially offsetting the benefits derived by heat treatment.

Supported catalysts, in fact, often become spent or depleted as a result of harsh processing conditions, including high temperature, by the catalyst particles migrating and agglomerating together. Washing and burnoff to remove impurities only partially restores conventional catalysts to their original activity precisely because such processes cannot reverse the deleterious effects of catalyst particle migration and agglomeration.

Because many catalysts are made using expensive metals such as noble metals, there is a need to provide improved catalysts and methods that increase the activity and stability of such catalysts.

BRIEF SUMMARY OF THE INVENTION

The present invention relates to improved methods for manufacturing supported and anchored nanocatalysts that increases the stability, activity and distribution of the individual nanocatalyst particles anchored to the support. Such methods include subjecting the supported catalyst or catalyst intermediate to elevated temperature in a heat treatment process, while maintaining at least a portion of the catalyst atoms in a non-zero oxidation state, in order to volatilize off at least one unwanted component. The invention also encompasses novel catalysts manufactured according to the inventive methods.

One exemplary embodiment for forming a supported catalyst having well-dispersed nanocatalyst particles anchored to the support includes: (i) providing a plurality of catalyst atoms; (ii) providing a dispersing agent comprising a plurality of organic molecules that have at least one functional group capable of binding to the catalyst atoms; (iii) reacting the dispersing agent with the catalyst atoms to form a catalyst complex capable of forming a bond or otherwise adhering to a support; (iv) attaching the catalyst complex onto a support to form an intermediate catalyst composition in which the catalyst atoms are in a non-zero oxidation state; and (v) heat treating the intermediate catalyst composition at a temperature above about 50° C. while the catalyst atoms are in the non-zero oxidation state so as to form a supported catalyst having well-dispersed nanocatalyst particles having a size less than about 100 nm anchored to the support. The heat treatment process typically volatilizes off at least one unwanted component from the catalyst intermediate.

The finished supported catalyst may include nanocatalyst particles in either a zero or non-zero oxidation state. A catalyst in a non-zero oxidation state can be converted into a catalyst in a zero oxidation (or ground) state by subjecting it to reducing conditions. Examples of uses of supported catalysts in a non-zero oxidation state include lab scale research, hydrodesulfurization of various petroleum fractions over $MoS_2$ or cobolt oxide and molybdenum oxide supported on alumina, ammoxidation of propylene to give acrylonitrile over bismuth molybdate, and polymerization of α-olefins over Ziegler-Natta catalysts, where the active catalytic site includes $Ti^{3+}$. Examples of uses of supported catalysts in a zero oxidation state include reforming of naphtha to enhance octane number, BTX formation, direct synthesis of hydrogen peroxide, and Fischer-Tropsch processes using reduced (zero valent) cobalt catalysts.

The dispersing agent is typically an organic molecule, oligomer or polymer having functional groups that bond to both the nanocatalyst particles and the support. Maintaining the catalyst metal atoms in a non-zero oxidation state during the heat treating process maintains a stronger bond between the catalyst metal atoms and the dispersing agent compared to heat treating a supported catalyst having catalyst metal atoms in the ground (or zero oxidation) state. This better inhibits migration and agglomeration of the tiny nanocatalyst particles during the heat treatment process.

It is also believed that heat treating the supported anchored catalyst while maintaining the nanocatalyst particles in a non-zero oxidation state during the heat treatment process also helps improve the dispersion, long-term stability, and catalytic activity of the supported catalyst. This would certainly be expected in the case where the catalyst particles remain in a non-zero oxidation state during use. However, it is also believed that the inventive heat treating process improves the dispersion, long-term stability, and activity of supported catalysts that are later reduced to a zero oxidation state. One reason might be that residual solvents impregnated in the supported catalyst can interfere with the ability of the dispersing agent to anchor the catalyst particles to the support. Removing such solvents while maintaining the catalyst particles in a non-zero oxidation state to improve bond strength reduces or eliminates the deleterious effect such solvents might otherwise have if the supported catalyst were heat treated after the nanocatalyst particles were reduced to the zero oxidation state.

According to one embodiment, multicomponent (e.g., bimetallic) supported catalysts can be made in which individual catalyst nanoparticles include a mixture (e.g., an alloy) of different metals or components. In general, forming nanoparticles comprising an alloy or mixture of two or more different components is highly disfavored from a thermodynamic standpoint because of (i) the high temperatures typically necessary to cause dissimilar metals to join together in a single nanoparticle and (ii) because such high temperatures typically cause nanoparticles to agglomerate together to form larger (e.g., micron- or larger-sized particles). Nevertheless, the use of the dispersing agent in the inventive catalyst manufacturing process reduces or eliminates same-component attractions that are normally present during catalyst formation and causes a more random and uniform distribution of metals within the nanocatalyst particles.

Examples of useful atoms that can be used to manufacture a wide variety of different catalysts include noble metals, base transition metals, rare earth metals, alkali metals, alkaline earth metals, and even non-metals (albeit in combination with one or more metals).

Notwithstanding the fact that the inventive methods are especially useful in forming multicomponent supported nanocatalyst particles, it is certainly within the scope of the invention to use the inventive methods in the manufacture of single component catalysts. Maintaining a stronger bond between the catalyst particles and the anchoring agent during the heat treatment process would be expected to inhibit particle migration and agglomeration regardless of their chemical makeup.

The catalyst nanoparticles can be anchored to any suitable substrate, examples of which include alumina, silica, silica gel, titania, kieselguhr, diatomaceous earth, bentonite, clay, zirconia, magnesia, as well as the oxides of various other metals, alone or in combination. They also include porous solids collectively known as zeolites, natural or synthetic, and related materials which have orderly or quasi-orderly pore structures. Another useful class of supports preferred for some applications include carbon-based materials, such as carbon black, activated carbon, graphite, fluoridated carbon, and the like. Other useful classes of support materials include organic solids, such as polymers, and metals and metal alloys The dispersing agent acts as an anchor to bind the catalyst nanoparticles to the substrate. This anchoring helps prevent the particles from agglomerating during use and also reduces leaching of the nanoparticles from the support material. The improved catalysts manufactured according to the invention have improved catalytic activity and a higher resistance to deactivation.

Examples of useful catalysts that can be manufactured according to the invention include reforming catalysts for the reforming of naphtha for octane number enhancement and/or for BTX formation. The improved dispersion and anchoring of nanoparticles and/or the improved distribution of catalyst components within the nanocatalyst particles overcome the disadvantages of prior reforming catalysts by providing increased longevity, activity, selectivity and/or hydrogen production.

These and other advantages and features of the present invention will become more fully apparent from the following description and appended claims as set forth hereinafter.

DETAILED DESCRIPTION OF EXEMPLARY EMBODIMENTS

I. Introduction

The present invention is directed to improved methods for manufacturing supported and anchored nanocatalysts that includes heat treating a supported catalyst or catalyst intermediate while maintaining at least a portion of the catalyst atoms in a non-zero oxidation state. Such methods are believed to increase the stability, activity and/or distribution of the individual nanocatalyst particles anchored to the support. The invention also relates to novel catalysts manufactured according to the inventive methods.

In an exemplary embodiment, a dispersing agent is used that bonds to the catalyst components and determines, at least in part, the molecular arrangement of the catalyst components. A dispersing agent can be used to ensure that two or more different catalyst components are distributed between nanocatalyst particles in a desired distribution. These nanocatalyst particles can be used to form supported catalysts with improved catalytic activity and increased longevity For purposes of this invention, the term "nanoparticles" or "nano-sized particles," means particles with a diameter of less than about 100 nanometers (nm).

The term "minority component" means the component in a multicomponent nanocatalyt particle with the lesser concentration within the particle. In the case where two or more components have essentially the same concentration within the particle, evidenced by the fact that the determination of a minority is statistically impractical, then either component is considered to be the minority component.

For purposes of disclosure and the appended claims, the term "Number Ratio" or "NR" is equal to $N_A/N_B$ where $N_A$ is the number (or moles) of atoms of a more numerous component A in a given nanoparticle or set of nanoparticles, and $N_B$ is the number (or moles) of atoms of a less numerous component B in the nanoparticle or set of nanoparticles. For a particular nanoparticle i, NR can be expressed as the specific value ($NR_i$). The average NR for all of the nanoparticles in a given set of nanoparticles is expressed as the average value ($NR_{avg}$).

In most cases, the individual NR values corresponding to the various particles within a given sample or set of nanoparticles do not equal a single discrete value but fall within a range of NR values (i.e., the "Range of NR"). The Range of NR for a given sample of set of nanoparticles having at least two different nanoparticle components within each particle has an upper value $NR_{max}$ and a lower value $NR_{min}$.

II. Components Used to Manufacture Supported Nanocatalysts and Intermediates Supported nanocatalysts according to the invention are typically manufactured using one or more different types of catalyst atoms, a dispersing agent, a support, and one or more solvents. As will be discussed more fully below, one or more catalyst metals or components are initially reacted with a dispersing agent to form a catalyst complex, typically using one or more solvents to form a solution, colloid or suspension comprising the solvent, catalyst complex, and optionally excess dispersion agent and/or catalyst component(s). The catalyst complex is impregnated onto or otherwise attached to a support to form an intermediate catalyst composition in which the catalyst atoms have a non-zero oxidation state. The intermediate catalyst composition is heat treated while the catalyst atoms are maintained in a non-zero oxidation state so as to form a supported catalyst having well-dispersed nanocatalyst particles having a size less than about 100 nm anchored to the support.

A. Catalyst Atoms

The catalyst atoms that form the catalyst nanoparticles of the present invention can include any metal, or combination of one or more metals or other elements, that exhibit a desired catalytic activity. Examples of useful catalyst atoms include one or more noble metals, which include platinum, palladium, iridium, gold, osmium, ruthenium, rhodium, and rhenium. Examples of other catalyst atoms include one or more base transition metals, rare earth metals, alkaline earth metals, alkali metals, and even non metals, which can be used alone or complexed or alloyed with other catalyst materials.

Platinum (Pt) is particularly useful as the primary catalyst component in reforming catalysts. Though less preferred, palladium (Pd), rhodium (Rh) and iridium (Ir) may also be used as the primary catalyst component, or they may be used in combination with platinum as a secondary catalyst component. Tin (Sn) and rhenium (Re) can be beneficially used in combination with platinum as a secondary catalyst component, as can be various other components such as germanium (Ge), lead (Pb), arsenic (As), antimony (Sb), tungsten (W), osmium (Os), cadmium (Cd), indium (In), titanium (Ti), phosphorus (P), gallium (Ga), ruthenium (Ru), calcium (Ca), magnesium (Mg), barium (Ba), and strontium (Sr).

As described below, the catalyst atoms are added to an appropriate solvent or carrier to form a solution or suspension. Catalyst atoms can be added to a solution in elemental (e.g., metallic) form, or added in ionic form. Typically, the catalyst atoms are added in ionic form so as to more readily dissolve or disperse within the solvent or carrier. Examples of suitable ionic forms include metal halides, nitrates or other appropriate salts that are readily soluble in a solvent or carrier. Specific examples include metal phosphates, sulfates, tungstates, acetates, citrates, and glycolates.

Metal components that are compounds themselves, such as oxides, can be added to a liquid medium in the appropriate compound form, or may be in a different chemical form that is converted to the appropriate chemical form during catalyst formation.

B. Dispersing Agents

The dispersing agent is selected to promote the formation of a catalyst complex that is able to bond or adhere to a support. In addition, the dispersing agent is selected to yield nanocatalyst particles that have a desired stability, size and/or uniformity. Dispersing agents within the scope of the invention include a variety of small organic molecules, as well as polymers and oligomers. Exemplary dispersing agents are able to interact and complex with catalyst atoms that are dissolved or dispersed within an appropriate solvent or carrier through various mechanisms, including ionic bonding, covalent bonding, Van der Waals interaction/bonding, or hydrogen bonding.

To provide bonding between the dispersing agent and the catalyst atoms, the dispersing agent includes one or more appropriate functional groups. Suitable functional groups for complexing the dispersing agent with the catalyst atoms include one or more of a hydroxyl, a carboxyl, a carbonyl, an amine, a thiol, an ester, an amide, a ketone, an aldehyde, a sulfonic acid, an acyl halide, a sulfonyl halide, and combinations of these. The dispersing agent can be monofunctional, bifunctional, or polyfunctional. In the case where the catalyst atoms are metals, the catalyst complex formed between the catalyst atoms and dispersing agent is typically an organometallic complex.

Examples of suitable monofunctional dispersing agents include alcohols such as ethanol and propanol and carboxylic acids such as formic acid and acetic acid. Useful bifunctional dispersing agents include diacids such as oxalic acid, malonic acid, maleic acid, and the like; dialcohols such as ethylene glycol, propylene glycol, 1,3-propanediol, and the like; and hydroxy acids such as glycolic acid, lactic acid, and the like. Useful polyfunctional dispersing agents include sugars such as glucose, polyfunctional carboxylic acids such as citric acid, hydroxy diacids, and the like.

Other useful dispersing agents include ethanolamine, mercaptoethanol, 2-mercaptoacetate, amino acids such as glycine and alanine, sulfonic acids such as sulfobenzyl alcohol and sulfobenzoic acid, and other sulfobenzyl compounds having amino and thiol functional groups.

Dispersing agents according to the invention also include polymers or oligomers, which can be natural or synthetic. In the case where the dispersing agent is an oligomer or polymer, the molecular weight, measured in number average, is preferably in a range from about 300 to about 15,000 Daltons, more preferably in a range of about 600 to about 6000 Daltons. However, it is recognized that even high molecular weight polymers, i.e., greater than 15,000, can be used as the dispersing agent if they are readily soluble in solvents, carriers or vehicles and can complex with the catalyst atoms.

The molecular weight of the polymer or oligomer molecules may be selected to yield a dispersing agent having a desired number of functional groups per molecule. In general, the number of functional groups may range from 4 to 200 functional groups per molecule, preferably from about 8 to about 80 functional groups, and more preferably from about 10 to about 20 functional groups. In many cases, the number of functional groups within a polymer or oligomer at least approximately corresponds to the number of repeating units.

Suitable polymers and oligomers within the scope of the invention include, but are not limited to, polyacrylic acid, polyacrylates, polyvinylbenzoates, polyvinyl sulfate, polyvinyl sulfonates, including sulfonated styrene, polybisphenol carbonates. polybenzimidizoles, polypyridine, sulfonated polyethylene terephthalate. Other suitable polymers include polyvinyl alcohol, polyethylene glycol, polypropylene glycol, and the like.

It may be advantageous to provide an excess of the dispersing agent so as to provide an excess of functional groups relative to the number of catalyst atoms. Including an excess of functional groups helps to ensure that all or substantially all of the catalyst atoms are complexed by the dispersing agent. Providing an excess of dispersing agent can also help to ensure the availability of functional groups for bonding the catalyst to a substrate where such bonding is desired.

In addition to the characteristics of the dispersing agent, it can also be advantageous to control the molar ratio of dispersing agent functional groups to catalyst atoms. For example, in the case of a divalent metal ion, two molar equivalents of a monovalent functional group would be necessary to provide the theoretical stoichiometric ratio. It may be desirable to provide an excess of dispersing agent functional groups to (1) ensure that all or substantially all of the catalyst atoms are complexed, (2) bond the nanoparticles to a support, and (3) help keep the nanoparticles segregated so that they do not clump or agglomerate together. In general, it will be preferable to include a molar ratio of dispersing agent functional groups to catalyst atoms in a range of about 1000:1 to about 1:1000 and more preferably in a range of about 50:1 to about 1:50.

The dispersing agents of the present invention allow for the formation of very small and uniform nanoparticles. In a preferred embodiment, the catalyst nanoparticles formed in the presence of the dispersing agent are preferably less than about 100 nm, more preferably less than about 10 nm, even more preferably less than about 6 nm, more especially preferably less than about 5 nm, and most preferably less than about 4 nm.

As discussed below, the nanocatalyst particles are supported on a support surface. It is believed that when a support material is added to a suspension or solution of catalyst complex, the dispersing agent acts to uniformly disperse the complexed catalyst atoms and/or suspended nanoparticles onto the support material. The dispersing agent can be selected such that it acts as an anchor between the nanocatalyst particles and a support material, which is described more fully below. During and after formation of the nanoparticles, the dispersing agent can act as an anchoring agent to secure the nanocatalyst particle to a substrate. Preferably, the substrate has a plurality of hydroxyl or other functional groups on the surface thereof which are able to chemically bond to one or more functional groups of the dispersing agent, such as by a condensation reaction. One or more additional functional groups of the dispersing agent are also bonded to one or more atoms within the nanoparticle, thereby anchoring the nanoparticle to the substrate.

While the dispersing agent has the ability to inhibit agglomeration without anchoring, chemically bonding the nanoparticle to the substrate surface through the dispersing agent is an additional and particularly effective mechanism for preventing agglomeration.

C. Catalyst Complexes

The term "catalyst complex" refers to a solution, suspension, or other composition in which a bond or coordination complex is formed between a dispersing agent and one or more different types of catalyst atoms. The "bond" between the dispersing agent and catalyst atoms can be ionic, covalent, electrostatic, or it can involve other bonding forces such as coordination with nonbonding electrons, Van der Waals forces, and the like.

Catalyst complexes include one or more different types of catalyst atoms. complexed with one or more different types of dispersing agents. In some cases, the catalyst complex comprises individual catalyst atoms bonded to the dispersing agent in solution or suspension within a solvent. In such cases, the catalyst particles are formed after attaching the catalyst complex to a support to form an intermediate catalyst composition and then subjecting the intermediate catalyst composition to one or more appropriate processing steps to yield the catalyst particles. In other cases, the catalyst complex includes or forms the nanocatalyst particles in suspension prior to applying the catalyst complex to the support.

It is also within the scope of the invention to remove the solvent to yield a dried catalyst complex that can be reconstituted at a later time to yield a solution or suspension that can be impregnated or applied to a support.

The catalyst complex may comprise an organometallic compound, either alone or in combination with another or additional dispersing agent. In an exemplary embodiment, the organometallic compound may have the general formula:

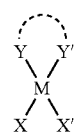

wherein:

a) X and X' are chosen independently of one another from a group including R, OR, OC(=O)R, halogen atoms and combinations of these, where R stands for an alkyl or aryl group. Halogen atoms are preferred. b) Y and Y' are electron-donating atoms, such as O, N, P, S, and others. Y and Y' may belong to a single coordinated compound or may be part of independently coordinated ligands.

According to one embodiment, the metal center of the organometallic complex. can be platinum, another noble metal, and/or other metal having desired catalytic activity.

D. Solvents and Carriers

A solvent or carrier can be used as a vehicle for the combining of the catalyst atoms (typically in the form of an ionic salt) and/or the dispersing agent. The solvent used to make the inventive precursor compositions may be an organic solvent, water or a combination thereof. Organic solvents that can be used include alcohols, ethers, glycols, ketones, aldehydes, nitrites, and the like.

Preferred solvents are liquids with sufficient polarity to dissolve the metal salts. These preferred solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

Other chemical modifiers may also be included in the liquid mixture. For example, acids or bases may be added to adjust the pH of the mixture. Surfactants may be added to adjust the surface tension of the mixture, or to stabilize the nanoparticles.

The solvent for the nanoparticle components may be a neat solvent, but it is preferable to use an acidic solution, as acids aid in the dissolution of the nanoparticle components. The solution may be acidified with any suitable acid, including organic and inorganic acids. Preferred acids are mineral acids such as sulfuric, phosphoric, hydrochloric, and the like, or combinations thereof. While it is possible to use an acid in a wide range of concentrations, relatively dilute solutions generally accomplish the desired solubility enhancement. Moreover, concentrated acid solutions may present added hazard and expense. Thus, dilute acid solutions are currently preferred.

E. Supports and Support Materials

The nanocatalyst particles are typically formed on or applied to a solid separate solid material to yield a supported catalyst. The solid support material may be organic or inorganic and can be chemically inert in the chemical reaction environment or serve a catalytic function complementary to the function of the catalyst particles. In the case where the catalytic reaction conditions involve higher temperatures, the support will preferably comprise an inorganic material.

Any solid support material known to those skilled in the art as useful catalyst particle supports can be used as supports for the nanocatalyst particles of this invention. These supports may be in a variety of physical forms. They may be either porous or non-porous. They may be 3-dimensional structures such as a powder, granule, tablet, extrudates, or other 3-dimensional structure. Supports may also be in the form of 2-dimensional structures, such as films, membranes, coatings, or other mainly 2-dimensional structures. It is even conceivable for the support to be a 1-dimensional structure, such as ultra-thin fibers or filaments.

In a preferred embodiment, the catalyst support comprises a porous inorganic material. These include, but are not limited to, alumina, silica, silica gel, titania, kieselguhr, diatomaceous earth, bentonite, clay, zirconia, magnesia, as well as the oxides of various other metals, alone or in combination. They also include porous solids collectively known as zeolites, natural or synthetic, which have ordered porous structures, and related materials with orderly or quasi-orderly pore structures. In the case where porous solids are used as the support material, it is preferred that the surface area of the support be at least 20 m²/g, and more preferably more than 50 m²/g.

Another useful class of supports include carbon-based materials, such as carbon black, activated carbon, graphite, fluoridated carbon, and the like. Other useful classes of support materials include organic solids, such as polymers, and metals and metal alloys.

It may be advantageous to treat the support material with a halogen, an example of which is chlorine, in order to give the catalyst acidity. Alternatively or in addition, it may be advantageous for the support to be sulfided.

The nanocatalyst particles can be deposited in a wide range of loadings on the support material. The loading can range from 0.01% to 90% by weight of the total weight of the supported catalyst particles. The preferred loading will depend on the specific application involved.

III. Method Of Manufacturing Catalysts

The inventive methods for manufacturing supported catalysts according to the invention can be broadly summarized as follows. First, one or more types of catalyst atoms and one or more types of dispersing agents are selected. Second, the catalyst atoms (e.g., metals or other components) and the dispersing agent are reacted or combined together to form one or more catalyst complexes. Third, the catalyst complexes are impregnated onto or otherwise attached to a support material to form an intermediate catalyst composition. Fourth, the intermediate catalyst composition is heat treated, preferably at a temperature above about 50° C., while the catalyst atoms are in a non-zero oxidation state so as to form a supported catalyst that includes well-dispersed nanocatalyst particles having a size less than about 100 nm anchored to the support and in order to volatilize off at least one unwanted component.

This method is useful in manufacturing both mono-component and multicomponent catalysts. In general, useful multicomponent intermediate catalyst compositions can be manufactured according to methods disclosed in U.S. application Ser. No. 10/990,616, filed Nov. 17, 2004, and entitled "MULTICOMPONENT NANOPARTICLES FORMED USING A DISPERSING AGENT", which is incorporated by reference. Intermediate catalyst compositions manufactured according to the foregoing application can then be heat treated according to the methods disclosed herein.

Returning to the inventive process, the catalyst complex made during the second step outlined above is generally formed by first dissolving the catalyst atoms and dispersing agent in an appropriate solvent or carrier and allowing the catalyst atoms to recombine as the catalyst complex so as to form a solution or suspension. In one embodiment, dispersed nanocatalyst particles form in the suspension. In an alternative embodiment, the dispersing agent facilitates the formation of nanocatalyst particles when disposed on a support surface in one or more subsequent steps.

The catalyst atoms can be provided in any form so as to be soluble or dispersible in the solvent or carrier that is used to form the catalyst complex. For example, catalyst atoms can be provided as metal salts that are readily dissolvable in the solvent or carrier. It may be advantageous to use metal chlorides and nitrates, since metal chlorides and nitrates are typically more soluble than other metal salts.

Catalyst atoms can be added to the solvent or carrier singly or in combination to provide final nanocatalyst particles that comprise a mixture of various types of catalyst atoms. For example, a platinum/tin reforming catalyst can be formed by first forming a precursor solution of platinum and a precursor solution of tin and then combining the precursor solutions. In general, the composition of the final nanocatalyst particles will be determined by the types of catalyst atoms added to the precursor solution. Therefore, control of the amounts of metal salts added to the precursor solution provides a convenient method to control the relative concentrations of different types of catalyst atoms in the final nanocatalyst particles.

The dispersing agent is added to the solvent or carrier in a manner so as to facilitate association of the dispersing agent with the catalyst atoms in order to form the catalyst complex. Some dispersing agents may themselves be soluble in the solvent or carrier. In the case of dispersing agents that include carboxylic acid groups, it may be advantageous to form a metal salt of the acids (e.g., an alkali or alkaline earth metal salt). For example, polyacrylic acid can be provided as a sodium polyacrylate salt, which is both readily soluble in aqueous solvent systems and able to react with catalyst metal salts to form a metal-polyacrylate complex that may be soluble or which may form a suspension within the solvent or carrier.

One aspect of the invention is that very small nanocatalyst particles can be controllably formed. The inventors believe that the relative amounts (or ratio) of dispersing agent to catalyst atoms may play a factor in determining the size of the resulting catalyst nanoparticles. In general, providing a stoichiometric excess of dispersing agent helps reduce particle agglomeration, thereby also generally reducing the size of the nanoparticles.

The catalyst complex is then impregnated into or otherwise applied to a support material to yield an intermediate catalyst composition. In one embodiment, the catalyst complex solution or suspension is physically contacted with a solid support. Contacting the catalyst complex with the solid support is typically accomplished by means of an appropriate solvent or carrier within the catalyst complex solution in order to apply or impregnate the catalyst complex onto the support surface to yield the intermediate catalyst composition.

Depending on the physical form of the solid support, the process of contacting or applying the catalyst complex to the support may be accomplished by a variety of methods. For example, the support may be submerged or dipped into a solution or suspension comprising a solvent or carrier and the catalyst complex. Alternatively, the solution or suspension may be sprayed, poured, painted, or otherwise applied to the support, such as by incipient wetness impregnation. Thereafter, the solvent or carrier is removed, optionally in connection with a reaction step that causes the dispersing agent to become chemically bonded or adhered to the support. Either way, the process yields an intermediate catalyst composition.

The intermediate catalyst composition is heat treated to further activate or prepare the supported catalyst atoms or particles for use in a desired catalyst process. It has been found that, in some cases, subjecting the nanocatalyst particles to a heat treatment process before using the catalyst causes the catalyst to be more active initially. The heat treatment process also volatilizes off unwanted molecules from the nanocatalyst particles. Heat treating can also be performed to increase the anchoring of the nanocatalyst particles to a support material. For example, in a naphtha reforming catalyst, progressively heating to 500° C. can improve the bonding between the nanocatalyst particles and a support material such as alumina or silica. Heat treatment can cause initial formation of nanocatalyst particles from individual complexed atoms in the case where nanoparticles are not formed in suspension prior to applying the catalyst complex to the support material.

The heat treatment process is carried out in an inert or oxidizing environment and with the catalyst atoms at least initially in a non-zero oxidation state. It is believed, at least in some cases, that reducing the catalyst atoms to a zero oxidation state prior to heat treating can weaken the interaction between the catalyst atoms and the dispersing agent and cause unwanted agglomeration of the nanocatalyst particles in some cases. In the non-zero oxidation state, the catalyst atoms form a much stronger bond to the dispersing agent because of the charge on the catalyst atom. Where the heat treating process causes some reduction of the catalyst atoms, performing the heat treatment process in an inert or oxidizing atmosphere helps maintain the catalyst atoms in the non-zero oxidation state longer than if treatment were carried out in a reducing environment, such as $H_2$.

Where the nanocatalyst particles are multicomponent nanoparticles, heat treating in the non-zero oxidation state is believed to improve the distribution and/or dispersion of components between nanocatalyst particles. Maintaining a strong bond between the dispersing agent and the different nanoparticle components reduces same-component attractions. Reducing same-component attractions allows more random distributions of the different catalyst atoms between nanoparticles and/or prevents same-component attractions from destroying distributions already present in the catalyst nanoparticles before the heat treating step is performed. Even in one-component catalyst systems, heat treating the catalyst while maintaining the catalyst atoms in a non-zero oxidation state can help prevent unwanted agglomeration of the nanocatalyst particles at the higher temperatures associated with the heat treatment process.

The heat treating process of the present invention is preferably carried out at a temperature in a range of about 50° C. to about 600° C., more preferably in a range of about 100° C. to about 500° C., and most preferably in a range of about 150° C. to about 400° C. The duration of the heat treatment process is preferably in a range of about 5 minutes to about 24 hours, more preferably in a range of about 30 minutes to about 12 hours, and most preferably in a range of about 1 hour to about 6 hours. A preferred inert environment for performing the heat treating step includes $N_2$.

One advantageous feature of heat treating the catalyst while maintaining the metal catalyst particles in a non-zero oxidation state is that it does not degrade the nanoparticles or reduce catalytic activity. The dispersing agent provides added stability that helps prevent destroying or agglomeration of the nanoparticles due to the strong interaction between the dispersing agent and catalyst atoms in a non-zero oxidation state.

According to one embodiment, a partial reducing step can be performed prior to heat treating to partially reduce the catalyst atoms. In this embodiment, the reducing step does not reduce the catalyst atoms to the zero oxidation state; rather, the catalyst atoms are only partially reduced (i.e., from a higher to a lower non-zero oxidation state). Typically, the catalyst atoms are only partially reduced if the reduction step is carried out at a sufficiently low temperature. In an exemplary embodiment, platinum catalyst atoms can be partially reduced by heating the nanocatalyst particles to a temperature less than about 100° C. in the presence of $H_2$.

Once the heat treating process is complete, it may be desirable to perform a high temperature reduction step. Performing the reduction process after the aforementioned heat treatment process is less likely to affect the dispersion and/or distribution of the catalyst atoms. It is believed that heat treating the catalyst atoms while in a non-zero oxidation state forms better anchored catalyst particles that are better stabilized when exposed to subsequent reduction conditions.

If desired, the catalyst nanoparticles can be reduced prior to using the catalyst by using a reducing procedure (e.g., hydrogenation). Hydrogen is one preferred reducing agent. Instead of, or in addition to, using hydrogen as the reducing agent, a variety of other reducing agents may be used, including, but not limited to, lithium aluminum hydride, sodium hydride, sodium borohydride, sodium bisulfite, sodium thiosulfate, hydroquinone, methanol, aldehydes, carbon monoxide, ammonia, and the like. The reduction process may be conducted at a temperature between 20° C. and 600° C.

Finally the catalyst can be further processed into a finished product of size and shape suitable for a specific reactor or process configuration. For example, a powder may be processed by, among other methods, extrusion, pelletizing, or spray drying.

IV. Characteristics Of Catalysts

The catalysts made according to the invention include well-dispersed nanocatalyst particles anchored to an appropriated support material. The catalysts may include one type of catalyst metal or component, or they may be multicomponent catalysts. The finished catalyst may contain catalyst atoms in either a non-zero oxidation state or a zero oxidation state. Examples of uses of supported catalysts in a non-zero oxidation state include lab scale research, hydrodesulfurization of various petroleum fractions over $MoS_2$ or cobolt oxide and molybdenum oxide supported on alumina, ammoxidation of propylene to give acrylonitrile over bismuth molybdate, and polymerization of α-olefins over Ziegler-Natta catalysts, where the active catalytic site includes $Ti^{3+}$. Examples of uses of supported catalysts in a zero oxidation state include reforming of naphtha to enhance octane number, BTX formation, direct synthesis of hydrogen peroxide, and Fischer-Tropsch processes using reduced (zero valent) cobalt catalysts.

In the case of multicomponent catalysts, at least about 50% of the nanoparticles in the supported catalyst will preferably include two or more of the nanocatalyst components. More preferably, at least about 75% of the nanoparticles within the supported catalyst include two or more of the nanocatalyst components, even more preferably at least about 85% of the nanoparticles within the supported multicomponent catalyst include two or more of the nanocatalyst components, and most preferably at least about 95% of the nanoparticles within the supported catalyst include two or more of the nanocatalyst components. It is within the scope of the invention for at least about 99% of the nanoparticles within a multicomponent catalyst made according to the invention to include two or more of the nanocatalyst components.

Because a substantial proportion of multicomponent nanocatalyst particles prepared according to the invention include two or more nanocatalyst components, the benefits derived from having the catalyst components in a single multicomponent particle are more uniformly distributed throughout the nanocatalyst particles compared to heterogeneous mixtures of single component catalyst particles. Consequently, the overall catalyst has an increased display of these beneficial properties.

According to another aspect of the invention, the degree of distribution of the two or more components between nanoparticles prepared according to the invention can be measured by the Number Ratio (NR) or Range of NR for a given set of nanoparticles having two or more components. The Number Ratio=$N_A/N_B$, where $N_A$ is the number (or moles) of atoms of a more numerous component A within a nanoparticle or set of nanoparticles according to the invention, and $N_B$ is the number (or moles) of atoms of a less numerous component B within the nanoparticle or set of nanoparticles. The value of NR can be expressed as an average value ($NR_{avg}$) for all of the nanoparticles in a given set or as the specific value ($NR_i$) for a particular nanoparticle i.

In an ideal case, the value $NR_i$ for each nanoparticle i in a given set of inventive nanoparticles equals $NR_{avg}$. In this case, each particle i has an equal distribution of components A and B. The present invention also contemplates controlling the dispersion of components in bi- or multicomponent nanoparticles such that the Range of NR values for all of the nanoparticles in a particular sample is within a desired range. The Range of NR has an upper value $NR_{max}$ and a lower value $NR_{min}$. As $NR_{max}$ and $NR_{min}$ deviate less from $NR_{avg}$, the Range of NR becomes narrower, which indicates that the nanoparticles are more uniform.

In a preferred embodiment, the value of $NR_{max}$ does not exceed about 5 times the value of $NR_{avg}$, more preferably does not exceed about 3 times the value of $NR_{avg}$, and most preferably does not exceed about 2 times the value of $NR_{avg}$.

Conversely, the value of $NR_{min}$ is preferably at least about 0.2 times the value of $NR_{avg}$, more preferably at least about 0.33 times the value of $NR_{avg}$, and most preferably at least about 0.5 times the value of $NR_{avg}$.

Given the foregoing, the Range of NR is therefore preferably about 0.2 to about 5 times the value of $NR_{avg}$, more preferably about 0.33 to about 3 times the value of $NR_{avg}$, and most preferably about 0.5 to about 2 times the value of $NR_{avg}$. It will be appreciated that the foregoing ranges do not count "outliers"(i.e., particles that do not form correctly and that excessively deviate from $NR_{avg}$ as to be outside the Range of NR). Whereas the NR of the "outliers" may in some cases count toward the $NR_{avg}$, they do not fall within the "Range of NR" by definition.

In a preferred embodiment, at least about 50% of the individual nanoparticles in a given catalyst will have an $NR_i$ within the Range of NR. More preferably, at least about 75% of the individual nanoparticles within the catalyst will have an $NR_i$ within the Range of NR, even more preferably at least about 85% of the individual nanoparticles within the catalyst will have an $NR_i$ within the Range of NR, and most preferably at least about 95% of the individual nanoparticles within the catalyst will have an $NR_i$ within the Range of NR. It is within the scope of the invention for at least about 99% of the individual nanoparticles within a catalyst according to the invention to have an $NR_i$ within the Range of NR.

In contrast to the relatively narrow Range of NR for nanoparticles made according to the present invention, the nanoparticles in the prior art have very wide Ranges of $NR_i$, in some cases ranging from zero to infinity, indicating that some particles have essentially none of one component, and other particles have essentially none of the other component(s).

The following two simple numerical examples provide non-limiting examples of nanocatalyst particles of the present invention having desired Ranges of NR. Consider a case where component B comprises 1% of a bimetallic nanoparticle mixture, and component A comprises the balance in a given set of nanoparticles. In this, case the $NR_{avg}$ for the set of nanoparticles is approximately 100. The preferred Range of NR for the set nanoparticles is thus 20 to 500, which translates to a range of 0.2% to 5% of component B in the individual nanoparticles that contain both components. The more preferred range for NR is 33 to 300, translating to a composition range of 0.33% to 3% of component B in the individual nanoparticles that contain both components. The most preferred range for $NR_i$ is 50 to 200, or a composition range of 0.5% to 2% component B in the individual nanoparticles that contain both components.

In a second simple numerical example, consider a case where component A and component B are each present in equal quantities of 50% of the total, such that the overall $NR_{avg}$ is 1. In this case, the preferred range of $NR_i$ is 0.2 to 5, corresponding to a composition range of 16% to 83% of component B in the individual nanoparticles that contain both components. The more preferred range of $NR_i$ is 0.33 to 3, corresponding to a composition range of 25% to 75% component B in the individual nanoparticles that contain both components. Finally, the most preferred range of $NR_i$ is 0.5 to 2, or a composition range of 33% to 67% component B in the individual nanoparticles that contain both components.

As discussed above, the dispersing agents of the present invention are used to provide the desired dispersion and uniformity that is characteristic of the nanocatalyst particles of the present invention. Using the dispersing agents according to the present invention, the above-mentioned uniformity as defined by NR can be obtained.

Typically, the dispersing agent remains as a constituent of the supported catalyst (i.e., as an anchoring agent that anchors the nanocatalyst particles to the support). The inventors of the present invention have found that characteristic features attributable to the dispersing agent can be present in the final nanocatalyst particle product, indicating that the dispersing agent persists beyond the nanocatalyst preparation steps.

While it is possible for the multicomponent nanoparticles to contain a true multicomponent compound: or crystal structure containing all components, this is not required. In one embodiment, each nanoparticle can be composed of a mixture of components regardless of how they are chemically combined. The components can be present as relatively isolated atoms, or as small atomic clusters. They can also be present as amorphous particles. The components can also be present as crystallites, including alloys. Component crystals can have relatively random crystal face exposures, or they can have a controlled or selective exposure of particular crystal faces.

The uniformity made possible by using a dispersing agent yields improved reforming catalyst properties. Many properties of multicomponent catalysts, such as longevity, depend on the proximity of the two components, such as platinum and tin. The substantially uniform distribution of components between nanocatalyst particles provides a greater possibility for these different components to come into proximity with one another to provide the desired functionality or property.

The dispersing agent also makes it possible to select very precise ratios of components by controlling the average percent composition. Because the individual multicomponent catalyst particles have a percent composition that varies very little from the average composition, the percent composition of the individual nanoparticles can be more precisely controlled by adjusting the starting materials to control the average percent composition.

V. EXAMPLES

The following examples illustrate supported and anchored nanocatalysts manufactured according to the inventive methods. In Example 1, a procedure according to the inventive was used to prepare a platinum-tin reforming catalyst. The Comparative Study tests the ability of this reforming catalyst to improve the octane number and form BTX products from a naphtha feed stock in a reforming process compared to a conventional catalyst. Examples 2-13 show additional reforming catalysts made using the inventive methods disclosed herein. Examples 14 and 15, which are partially hypothetical in nature, are included to better show a broad range of processing steps for manufacturing supported and anchored nanocatalysts according to the invention.

Example 1

A reforming catalyst according to the present invention was prepared using platinum and tin as catalyst components. The catalyst was prepared using the following steps and concentrations:

(i) A platinum solution was prepared by dissolving 1.0209 g of $H_2PtCl_6 \cdot 6H_2O$ (Pt: 38-40%, select 39%) in water and diluting to 100.0 ml. The final concentration of the platinum solution was 0.003982 g Pt/ml.

(ii) A tin solution was prepared by mixing 1.9390 g of $SnCl_2 \cdot 2H_2O$ (98%) and 5.74 g of 37% HCl solution in water to dissolve the tin $Cl_2$. The Tin solution was then diluted to 200.0 ml to form a solution with a tin concentration of 0.004999 g Sn/ml.

(iii) Solution A was prepared by diluting 23.56 g of the 0.003982 g Pt/ml solution to form 100 g solution and then adding 4.4 g of 37% HCl solution while stirring.

(iv) Solution B was prepared by diluting 12.96 g of the 0.004999 g Sn/ml solution with water to form a 100 g solution and then adding Solution A.

(v) Solution C was prepared by letting Solution B stand for 1 hour and then adding 1.67 g of 37% HCl solution.

(vi) Solution D was prepared by diluting 2.73 g of 45% polyacrylic acid sodium salt solution to 220 g using water and then adding Solution C.

(vii) Solution D was purged with 100 ml/min $N_2$ for 1 hour. The $N_2$ was replaced by 100 ml/min $H_2$ for 20 min. The flask was then sealed overnight while continuously stirring.

(viii) 27.60 g of $Al_2O_3$ in the form of 1/16 inch diameter spheres was placed under vacuum for 30 min and then impregnated with about 80 ml of methanol for 30 min. The methanol excess was removed by using a pipette. The $Al_2O_3$ support was then added to solution D. The resulting mixture was heated by an IR lamp under rotation until all the liquid evaporated.

(ix) The sample, which included platinum and tin atoms initially in a non-zero oxidation state, was then placed in a muffle furnace and heat treated in a $N_2$ according to the following procedure:
  1) Heated from room temperature to 120° C. at 3° C./min
  2) Held at 120° C. for 2 h
  3) Heated from 120° C. to 300° C. at 3° C./min
  4) Held at 300° C. for 2 h
  5) Heated from 300° C. to 500° C. at 1° C./min
  6) Held at 500° C. for 2 h (x) After cooling to room temperature, the sample was taken out and washed twice with hot (80-90° C.) water, using 100 ml each time. This was followed by washing 3 times with water at room temperature using 100 ml each time to remove any remaining sodium ions. The sample was then placed in a drying oven for 2 hours.

(xi) The sample was then impregnated with an HCl solution prepared by mixing 0.83 g of a 37% HCl solution and 29.2 g of water. The sample was dried at room temperature followed by a 2 h period in a drying oven and finally placed in a muffle furnace under flowing air at 200° C. for 2 h. After cooling to room temperature the sample was weighed and packed in a bottle. The resulting catalyst had a weight composition of 0.34% Pt, 0.23% Sn, and 1.08% Cl.

Comparative Study

In the Comparative Study, the inventive Pt—Sn reforming catalyst of Example 1 was loaded in a fixed bed reactor and used for the catalytic reforming of naphtha. For direct comparison, a conventional reforming catalyst was used (i.e., made without the use of the dispersing agent). The conventional reforming catalyst was supported on the same material and had the same elemental composition as the inventive reforming catalyst of Example 1, but was prepared without the use of a dispersing agent. The conventional reforming catalyst and the inventive reforming catalyst of Example 1 were loaded in identical reactors and subjected to the same pretreatment and reaction conditions.

For each reaction test, approximately 21 g of solid catalyst were loaded in a tubular reactor where the heated volume was divided into two equal catalyst beds separated by a reheating zone. Both catalysts were diluted with inert glass beads to improve the isothermicity of the beds. Naphtha feed with density of 59.6° API (0.7405 g/cc), impurity levels below 1 ppm of both sulfur and nitrogen, and initial and final boiling points of 68.7° C. and 143° C., respectively, was dried by flow through a molecular sieve bed to ensure its moisture level was below 20 ppm. Prior to reaction, the oxidized catalyst was reduced in pure hydrogen for 12 h at 480° C. The reforming reaction was conducted at 480° C. and 100 psig, with a continuous feed of 50 g/h of naphtha and 2.11 scf/h of hydrogen. This translates into a weight hourly space velocity (WHSV) of 2.4 $h^{-1}$ and hydrogen to hydrocarbon molar ratio of 5.0. These values are well within the usual ranges of operation for conventional CCR reactors. The outlet gas was analyzed by gas chromatograph (GC) to determine the amounts of hydrogen and light hydrocarbon gases ($C_1$-$C_4$) produced. The reaction was run for 90 hours, at which time the feed gas was stopped and the liquid production collected and its detailed composition and research octane number (RON) were determined.

The results comparing the use of the supported reforming catalyst of Example 1 to a conventional reforming catalyst are shown in Table I. The research octane number (RON) was determined by the standard ASTM engine test method.

TABLE I

| | Naphtha | Reforming Catalyst | |
|---|---|---|---|
| | Feed | Conventional | Example 1 |
| Liquid specific gravity | 0.7405 | 0.7813 | 0.7914 |
| Research octane number (RON) | 67.5 | 87.7 | 92.4 |
| Product distribution wt % | | | |
| $H_2$ | — | 1.7 | 2.0 |
| $C_1$ | — | 0.3 | 0.5 |
| $C_2$ | — | 0.4 | 1.0 |
| $C_3$ | — | 0.8 | 1.7 |
| $C_4$ | — | 0.7 | 1.9 |
| $C_5$ + (reformate) | — | 96.1 | 92.9 |
| $H_2$ production (scf/bbl) | — | 837 | 985 |
| Aromatics composition (wt %) | | | |
| Benzene | 0.24 | 4.02 | 5.31 |
| Toluene | 4.46 | 25.63 | 31.08 |
| o-Xylene | 0.25 | 4.38 | 4.91 |
| m-Xylene | 0.74 | 7.71 | 8.95 |
| p-Xylene | 0.25 | 3.28 | 3.82 |

TABLE I-continued

| | Naphtha Feed | Reforming Catalyst Conventional | Reforming Catalyst Example 1 |
|---|---|---|---|
| Ethylbenzene | 0.49 | 2.30 | 2.69 |
| other aromatics | 0.00 | 2.14 | 2.43 |
| Total aromatics | 6.42 | 49.47 | 59.18 |

The results in Table I show that the inventive reforming catalyst of Example 1 has a highly improved octane number, hydrogen production, and aromatics content in the liquid reformate product as compared with the conventional reforming catalyst used in the test. The improved increase in specific gravity of the product formed using the inventive reforming catalyst of Example 1 over the product formed using the conventional reforming catalyst is consistent with the values for the higher level of hydrogen produced using the reforming catalyst of Example 1. These results show that the reforming catalyst of the present invention can be used for increasing motor fuel octane number, and also for the production of BTX and other aromatics.

The tests also suggest that providing a reforming catalyst having catalyst particles that include both platinum and tin atoms blended together provides superior catalytic reforming activity. This suggests that the platinum and tin atoms are more evenly dispersed throughout the supported catalyst compared to conventional reforming catalysts that are heated treated or calcined in the absence of a strong bond between catalyst atoms in a non-zero oxidation state and a dispersing/anchoring agent.

Example 2

A reforming catalyst manufactured according to the methods of the present invention was prepared using platinum and tin as catalyst components. The catalyst was prepared using the following steps and concentrations:

(i) 30 g of an $Al_2O_3$ support in form of 1/16 inch diameter spheres was impregnated with 150 ml of 2.0% sodium hydroxide solution for 2 hours. The $Al_2O_3$ was collected by filter, washed with water and acetone, and then dried at 90° C. for 4 hours.

(ii) 0.2335 g of cis-dichlorobis(diethyl sulpide)-platinum (II) and 0.2254 g of dichlorobis(acetylacetonate)-tin (IV) was dissolved in 20 ml of toluene.

(iii) 30 g of the $Al_2O_3$ from step (i) was added to 30 ml toluene, followed by addition of the solution prepared in step (ii). The mixture was gently agitated by a suspension stir bar for 12 hours in nitrogen atmosphere to form a solid sample. The solid sample was filtered out, washed with toluene, and then dried at 90° C. for 2 hours.

(iv) The sample which included platinum and tin atoms initially in a non-zero coordinated complex state, was then placed in a muffle furnace and heat treated in air according to the following procedure:
1) Heated from room temperature to 300° C. at 7° C./min
2) Held at 300° C. for 2 h
3) Heated from 300° C. to 500° C. at 3° C./min
4) Held at 500° C. for 2 h (v) After cooling to room temperature, the sample was impregnated with a dilute HCl solution (prepared by mixing 0.83 g of a 37% HCl solution and 29.2 g of water) for 8 hours. The sample was dried in a drying oven at 80° C. for 12 hours. The resulting catalyst had a weight composition of 0.34% Pt, 0.23% Sn, and 1.08% Cl.

Example 3

A reforming catalyst according to the methods of the present invention was prepared using platinum and tin as catalyst components. The catalyst was prepared using the following steps and concentrations:

(i) 209.1 mg of $Pt(acac)_2$ and 229.2 mg of $Sn(acac)_2Cl_2$ were dissolved in 100 ml acetone.

(ii) 30 g of $Al_2O_3$ support was soaked in 100 ml acetone for 2 hours. Then the acetone was removed by decantation.

(iii) The solution from step (i) was added to the pretreated $Al_2O_3$ support from step (ii) and dried by rotating vacuum evaporation.

(iv) The resulting mixture from step (iii) was placed in an oven at 70° C. for 6 hours and then moved into a preheating muffle furnace at 300° C. for 1 hour and at 480° C. for 3 hourr under nitrogen atmosphere.

(v) After cooling to room temperature, the sample was then impregnated with a dilute HCl solution prepared by mixing 0.93 g of a 37% HCl solution and 25 ml of water. The sample was dried at room temperature, followed by a 2 hour period in a drying oven. After cooling to room temperature the sample was weighed and packed in a bottle. The resulting catalyst had a weight composition of 0.34% Pt, 0.23% Sn, and 1.08% Cl.

Example 4

A reforming catalyst manufactured according to the methods of the present invention was prepared using platinum and tin as catalyst components. The catalyst was prepared using the following steps and concentrations:

(i) 275.52 mg of $H_2PtCl_6.6H_2O$ (0.532 mmol) and 133.36 mg of $SnCl_2.2H_2O$ (0.591 mmol) were dissolved in 30 ml ethylene glycol.

(ii) The solution was impregnated onto 30 g of $Al_2O_3$ support.

(iii) The resulting mixture was dried in vacuum oven at 100° C. for 6 hours.

(iv) The sample, which included platinum and tin atoms initially in a non-zero oxidation state, was then placed in a muffle furnace and heat treated under $N_2$ according to the following procedure:
1) Heated from room temperature to 120° C. at 3° C./min
2) Held at 120° C. for 2 h
3) Heated from 120° C. to 300° C. at 3° C./min
4) Held at 300° C. for 2 h
5) Heated from 300° C. to 500° C. at 1° C./min
6) Held at 500° C. for 2 h (v) After cooling down to room temperature, the sample was washed with copious water. The sample was then dried at 80° C. for 2 hours.

(vi) After cooling to room temperature, the sample was then impregnated with a dilute HCl solution prepared by mixing 0.93 g of a 37% HCl solution and 25 ml of water. The sample was dried at room temperature, followed by a 2 hour period at 80° C. in an oven. After cooling to room temperature, the sample was weighed and packed in a bottle. The resulting catalyst had a weight composition of 0.34% Pt, 0.23% Sn, and 1.08% Cl.

Example 5

A reforming catalyst manufactured according to the methods of the present invention was prepared using platinum and tin as catalyst components. The catalyst was prepared using the following steps and concentrations:

(i) A platinum solution was prepared by dissolving 0.9950 g of $H_2PtCl_6 \cdot 6H_2O$ (Pt: 38-40%, select 39%) in water and diluting to 100.0 ml. The final concentration of platinum in the solution was 0.003881 g Pt/ml.

(ii) A tin solution was prepared by mixing 7.66 g of $SnCl_2 \cdot 2H_2O$ (98%) and 10 g of 37% HCl solution in water to dissolve the $SnCl_2$. The tin solution was then diluted to 200.0 ml to form a solution with a tin concentration of 0.01976 g Sn/ml.

(iii) Solution A was prepared by mixing 4.0 g of 37% HCl, 24.18 g of the 0.003881 g Pt/ml solution prepared in step (i) and 3.21 g of the 0.01976 g Sn/ml solution prepared in step (ii) and then adding 6.26 g of a 0.001169 g/ml glycolic acid solution.

(iv) Solution B was prepared by heating solution A to boiling, refluxing for 10 minutes, and then cooling it to room temperature.

(v) 27.60 g of $Al_2O_3$ in the form of 1/16 inch diameter spheres was placed under vacuum for 30 minutes and then impregnated with 50 ml of methanol for 30 minutes. The methanol excess was removed by using a pipette. Solution B was then added to the $Al_2O_3$ and impregnated at room temperature until all the liquid evaporated.

(vi) The sample was then dried for 3 hours in a drying oven, and then placed in a muffle furnace and heat treated in air according to the following procedure:
  1) Heated from room temperature to 120° C. at 3° C./min
  2) Held at 120° C. for 2 hours
  3) Heated from room temperature to 300° C. at 3° C./min
  4) Held at 300° C. for 2 hours
  5) Heated from room temperature to 500° C. at 1° C./min
  6) Held at 500° C. for 2 hours (vii) After cooling to room temperature, the sample was taken out. The sample was then impregnated with a dilute HCl solution prepared by mixing 0.83 g of a 37% HCl solution and 29.2 g of water.

(viii) The sample was dried at room temperature, and then dried in a drying oven overnight. After cooling to room temperature the sample was weighed and packed in a bottle. The resulting catalyst had a weight composition of 0.34% Pt, 0.23% Sn and 1.08% Cl.

Example 6

A reforming catalyst manufactured according to the methods of the present invention was prepared using platinum and tin as catalyst components. The catalyst was prepared using the following steps and concentrations:

(i) A platinum solution was prepared by dissolving 1.0200 g of $H_2PtCl_6 \cdot 6H_2O$ (Pt: 38-40%, select 39%) in water and diluting to 100.0 ml. The final concentration of platinum in solution was 0.003978 g Pt/ml.

(ii) A tin solution was prepared by mixing 1.23 g of $SnCl_2 \cdot 2H_2O$ (98%) and 4.3 g of 37% HCl solution in water to dissolve the $SnCl_2$. The tin solution was then diluted to 200.0 ml with water to form a solution having a tin concentration of 0.003236 g Sn/ml.

(iii) Solution A was prepared by diluting 23.59 g of the 0.003978 g Pt/ml solution from step (i) with water to form a 100 g solution and then adding 4.4 g of 37% HCl while stirring.

(iv) Solution B was prepared by diluting 19.62 g of the 0.003236 g Sn/ml solution from step (ii) with water to form a 100 g solution, adding this solution to Solution A, and then adding 1.67 g 37% HCl to Solution B.

(v) Solution C was prepared by diluting 2.73 g of a 45% polyacrylic acid (sodium salt) solution with 220 g of water and adding this to solution B.

(vi) Solution C was purged with 100 ml/min $N_2$ for 1 hour. After that, the $N_2$ was replaced with 100 ml/min $H_2$ for 20 minutes. The flask was then sealed overnight while continuously stirring.

(vii) 27.60 g of $Al_2O_3$ in the form of 1/16 inch diameter spheres was placed under vacuum for 30 minutes and then impregnated with 50 ml of methanol for 30 minutes. The methanol excess was removed by using a pipette. Solution C was then added to the $Al_2O_3$. The resulting mixture was heated by an IR lamp under rotation until all the liquid evaporated.

(viii) The sample was then dried overnight at drying oven, and then placed in a muffle furnace and heat treated under $N_2$ according to the following procedure:
  1) Heated from room temperature to 120° C. at 3° C./min
  2) Held at 120° C. for 2 hours
  3) Heated from room temperature to 300° C. at 3° C./min
  4) Held at 300° C. for 2 hours
  5) Heated from room temperature to 500° C. at 1° C./min
  6) Held at 500° C. for 2 hours (ix) After cooling to room temperature, the sample was taken out and washed twice with hot (80-90° C.) water, using 100 ml each time. This was followed by washing 3 times with water at room temperature using 100 ml each time to remove any remaining sodium ions. The sample was then placed in a drying oven for 4 hours.

(x) The sample was then impregnated with a dilute HCl solution (prepared by mixing 0.42 g of a 37% HCl solution and 29.6 g of water) overnight at room temperature. Then the sample was dried at about 40° C., and then dried in a drying oven for 4 hours. After cooling to room temperature the sample was weighed and packed in a bottle. The resulting catalyst had a weight composition of 0.34% Pt, 0.23% Sn, and 0.54% Cl.

Example 7

A reforming catalyst manufactured according to the methods of the present invention was prepared using platinum and tin as catalyst components. The catalyst was prepared using the following steps and concentrations:

(i) A platinum solution was prepared by diluting 406.35 mg of a 25.52 wt % $H_2PtCl_6$ aqueous solution to 15 ml with water.

(ii) A tin solution was prepared by dissolving 133.36 mg of $SnCl_2 \cdot 2H_2O$ (98%) to 15 ml with de-ionized water together with 4 g 37% HCl.

(iii) Solution A was prepared by mixing the platinum solution from step (i) with the tin solution from step (ii).

(iv) Solution B was prepared by adding 215.75 mg citric acid to Solution A.

(v) Solution B was refluxed for 1 hour, then cooled down to room temperature while continuously stirring.

(vi) 30 g of $Al_2O_3$ in the form of 1/16 inch diameter spheres was placed under vacuum for 30 minutes and then impregnated with about 50 ml of methanol for 30 minutes. The methanol excess was removed by using a pipette. The $Al_2O_3$ support was then added to solution B. The resulting mixture was heated on the hotplate until all the liquid evaporated.

(vii) The resulting mixture was placed into an oven at 80° C. for 3 hours.

(viii) The sample, which included platinum and tin atoms initially in a non-zero oxidation state, was then placed in a muffle furnace and heat treated under $N_2$ according to the following procedure:
1) Heated from room temperature to 120° C. at 3° C./min
2) Held at 120° C. for 2 h
3) Heated from 120° C. to 300° C. at 3° C./min
4) Held at 300° C. for 2 h
5) Heated from 300° C. to 500° C. at 1° C./min
6) Held at 500° C. for 2 h (ix) After cooling down to room temperature, the heat treated catalyst was washed with 1500 ml de-ionized water (750 ml cold+750 ml warm water (~80° C.)).

(xi) The sample was then impregnated with a dilute HCl solution prepared by mixing 0.93 g of a 37% HCl solution and 25 ml of water. The sample was dried at room temperature followed by a 2 hour period in a drying oven. After cooling to room temperature the sample was weighed and packed in a bottle. The resulting catalyst had a weight composition of 0.34% Pt, 0.23% Sn, and 1.08% Cl.

Example 8

A reforming catalyst manufactured according to the methods of the present invention was prepared using platinum as the catalyst component. The catalyst was prepared using the following steps and concentrations:

(i) A platinum solution was prepared by dissolving 1.0200 g of $H_2PtCl_6.6H_2O$ (Pt: 38-40%, select 39%) in water and diluting to 100.0 ml. The final concentration of platinum in this solution was 0.003978 g Pt/ml.

(ii) Solution A was prepared by diluting 3.00 g of a 0.001169 g/ml glycolic acid solution to 22.6 g and then mixing this with 22.62 g of a 0.003978 g Pt/ml solution.

(iii) Solution B was prepared by heating solution A to boiling, refluxing for 10 minutes, and then cooling to room temperature.

(iv) 30.00 g of $Al_2O_3$ in the form of 1/16 inch bar was placed under vacuum for 30 minutes and then impregnated with 80 ml of methanol for 30 minutes. The methanol excess was removed using a pipette. Solution B was then added to the $Al_2O_3$ and impregnated at room temperature overnight.

(v) The sample was heated to about 40° C. and held until it was dry, then dried for 3 hours in a drying oven, and then placed in a muffle furnace and heat treated under $N_2$ according to the following procedure:
1) Heated from room temperature to 120° C. at 3° C./min
2) Held at 120° C. for 2 hours
3) Heated from room temperature to 300° C. at 3° C./min
4) Held at 300° C. for 2 hours
5) Heated from room temperature to 480° C. at 1° C./min
6) Held at 480° C. for 2 hours (vi) After cooling to room temperature, the sample was removed from the muffle furnace. The sample was then impregnated with a dilute HCl solution prepared by mixing 0.80 g of a 37% HCl solution and 29.2 g of water.

(vii) The sample was dried at about 40° C. and then dried in a drying oven overnight. After cooling to room temperature the sample was weighed and packed in a bottle. The resulting catalyst had a weight composition of 0.3% Pt and 1% Cl.

Example 9

A reforming catalyst manufactured according to the methods of the present invention was prepared using platinum as the catalyst component. The catalyst was prepared using the following steps and concentrations:

(i) A platinum solution was prepared by dissolving 1.0200 g of $H_2PtCl_6.6H_2O$ (Pt: 38-40%, select 39%) in water and diluting to 100.0 ml. The final concentration of platinum in the solution was 0.003978 g Pt/ml.

(ii) Solution A was prepared by diluting 22.62 g of the 0.003978 g Pt/ml solution from step (i) to 204 ml with water.

(iii) Solution B was prepared by diluting 1.23 g of a 45% polyacrylic acid (sodium salt) solution to 204 ml with water and then adding this to solution A.

(iv) Solution B was purged with $N_2$ at 100 ml/min for 1 hour. Thereafter, the $N_2$ was replaced by 100 ml/min $H_2$ for 20 minutes. The flask was then sealed overnight while continuously stirring.

(v) 30.00 g of $Al_2O_3$ in the form of 1/16 inch bar was placed under vacuum for 30 minutes and then impregnated with 80 ml of methanol for 30 minutes. The methanol excess was removed with a pipette. Solution B was then added to the treated $Al_2O_3$. The resulting mixture was heated using an IR lamp until all the liquid evaporated.

(vi) The sample was dried overnight in a drying oven, then placed in a muffle furnace and heat treated under $N_2$ according to the following procedure:
1) Heated from room temperature to 120° C. at 3° C./min
2) Held at 120° C. for 2 hours
3) Heated from room temperature to 300° C. at 3° C./min
4) Held at 300° C. for 2 hours
5) Heated from room temperature to 480° C. at 1° C./min
6) Held at 480° C. for 2 hours (vii) After cooling to room temperature, the sample was taken out and washed twice with hot (80-90° C.) water, using 100 ml each time. This was followed by washing 3 times with water at room temperature using 100 ml each time to remove any remaining sodium ions. The sample was then placed in a drying oven for 2 hours.

(viii) The sample was then impregnated with a dilute HCl solution prepared by mixing 0.80 g of a 37% HCl solution and 29.2 g of water. The sample was dried at about 40° C., and then dried in a drying oven overnight. After cooling to room temperature the sample was weighed and packed in a bottle. The resulting catalyst had a weight composition of 0.3% Pt and 1% Cl.

Example 10

A reforming catalyst manufactured according to the methods of the present invention was prepared using platinum as the catalyst component. The catalyst was prepared using the following steps and concentrations:

(i) A platinum solution was prepared by dissolving 5.0942 g of $H_2PtCl_6.6H_2O$ (Pt: 38-40%, select 39%) in water and diluting to 100.0 ml. The final concentration of platinum in the solution was 0.01987 g Pt/ml.

(ii) Solution A was prepared by mixing 4.53 g of the 0.01987 g Pt/ml solution from step (i) with 0.035 g of 98% glycine and then diluting to 25 g.

(iii) Solution B was prepared by heating solution A to boiling, refluxing for 30 minutes, and then cooling to room temperature.

(v) 30.00 g of $Al_2O_3$ in the form of 1/16 inch bar was placed under vacuum for 30 minutes and then impregnated with 50 ml of methanol for 30 minutes. The methanol excess was removed using a pipette. Solution B was then added to the treated $Al_2O_3$ and impregnated at about 40° C. until it was dry.

(vi) The sample was then dried in a drying oven overnight, then placed in a muffle furnace and heat treated in air according to the following procedure:
1) Heated from room temperature to 120° C. at 3° C./min
2) Held at 120° C. for 2 hours
3) Heated from room temperature to 300° C. at 3° C./min
4) Held at 300° C. for 2 hours
5) Heated from room temperature to 500° C. at 1° C./min
6) Held at 500° C. for 2 hours (vii) After cooling to room temperature, the sample was removed from the muffle furnace. The sample was then impregnated with a dilute HCl solution prepared by mixing 0.83 g of a 37% HCl solution and 24.2 g of water.

(viii) The sample was dried at about 40° C., and then dried in a drying oven for 3 hours. After cooling to room temperature the sample was weighed and packed in a bottle. The resulting catalyst had a weight composition of 0.3% Pt and 1% Cl.

Example 11

A reforming catalyst manufactured according to the methods of the present invention was prepared using platinum as active component, an alumina support, and a citric acid dispersing agent. The catalyst was prepared using the following steps and concentrations:
(i) A platinum solution was prepared by diluting 343.73 mg of a 25.52 wt % $H_2PtCl_6$ aqueous solution to 50 ml with water.
(ii) 86.45 mg of citric acid was dissolved to 50 ml in water and then added to the above $H_2PtCl_6$ aqueous solution from step (i).
(iii) The mixture from step (ii) was refluxed for 1 hour, then cooled down to room temperature while continuously stirring.
(iv) 28.86 g of $Al_2O_3$ was placed under vacuum for 30 minutes and then impregnated with about 50 ml of methanol for 30 minutes. The methanol excess was removed by pipette. The $Al_2O_3$ support was then added to the solution from step (iii). The resulting mixture was dried on the hotplate until all the liquid evaporated.
(v) The resulting mixture was placed into oven at 80° C. for 3 hours.
(vi) The sample, which included platinum atoms initially in a non-zero oxidation state, was then placed in a muffle furnace and heat treated under $N_2$ according to the following procedure:
  (1) Heated from room temperature to 120° C. at 3° C./min
  (2) Held at 120° C. for 2 h
  (3) Heated from 120° C. to 300° C. at 3° C./min
  (4) Held at 300° C. for 2 h
  (5) Heated from 300° C. to 500° C. at 1° C./min
  (6) Held at 500° C. for 2h
(vii) After cooling down to room temperature, the heat treated catalyst was washed with 1500 ml de-ionized water (750 ml cold+750 ml warm water (~80° C.)).
(viii) The sample was then impregnated with a dilute HCl solution prepared by mixing 0.81 g of a 37% HCl solution and 25 ml of water. The sample was dried at room temperature, followed by a 2 hour period in a drying oven at 80° C. After cooling to room temperature the sample was weighed and packed in a bottle. The resulting catalyst had a weight composition of 0.3% Pt and 1% Cl.

Example 12

A reforming catalyst based on platinum and manufactured according to the methods of the present invention was prepared using the following steps and concentrations:
(i) 30 g of $Al_2O_3$ support in form of 1/16 inch diameter spheres was impregnated with 150 ml of a 2.0% sodium hydroxide solution for 2 hours. The treated $Al_2O_3$ was collected by filtration, washed with water and, acetone, and then dried at 90° C. for 4 hours.
(ii) 0.206 g of cis-dichlorobis(diethyl sulfide)-platinum (II) was dissolved in 20 ml toluene.
(iii) 30 g of the treated $Al_2O_3$ from step (i) was added to 30 ml toluene, followed by addition of the solution prepared in step (ii). The whole mixture was gently agitated using a suspension stir bar for 12 hours under a nitrogen atmosphere to form a solid sample. The solid sample was removed by filteration, washed with toluene, and then dried at 90° C. for 2 hours.
(iv) The sample, which included platinum atoms initially in a non-zero oxidation state, was then placed in a muffle furnace and heat treated under $N_2$ according to the following procedure:
  (1) Heated from room temperature to 300° C. at 7° C./min in air atmosphere
  (2) Held at 300° C. for 2 h
  (3) Heated from 300° C. to 500° C. at 3° C./min and changed into nitrogen atmosphere
  (4) Held at 500° C. for 3 h.
(v) After cooling to room temperature, the sample was impregnated with a dilute HCl solution (prepared by mixing 0.768 g of a 37% HCl solution and 29.2 g of water) for 8 hours. The sample was dried in a drying oven at 80° C. for 12 hours. The resulting catalyst had a weight composition of 0.30% Pt and 1.0% Cl.

Example 13

A reforming catalyst manufactured according to the methods of the present invention was prepared using platinum and tin as catalyst components. The catalyst was prepared using the following steps and concentrations:
(i) A platinum solution was prepared by dissolving 1.0200 g of $H_2PtCl_6.6H_2O$ (Pt: 38-40%, select 39%) in water and diluting to 100.0 ml. The final concentration of platinum in this solution was 0.003978 g Pt/ml.
(ii) A tin solution was prepared by mixing 1.23 g of $SnCl_2.2H_2O$ (98%) and 4.3 g of 37% HCl solution in water to dissolve the $SnCl_2$. The Tin solution was then diluted with water to 200.0 ml to form a solution with a tin concentration of 0.003236 g Sn/ml.
(iii) Solution A was prepared by mixing 4.0 g of 37% HCl, 23.59 g of the 0.003978 g Pt/ml solution from step (i), 19.62 g of the 0.003236 g Sn/ml from step (ii), and 0.08 g of glycine.
(iv) Solution B was prepared by heating solution A to boiling, refluxing for 30 minutes, and then cooling to room temperature.

(v) 27.60 g of $Al_2O_3$ in the form of 1/16 inch diameter spheres was placed under vacuum for 30 minutes and then impregnated with 50 ml of methanol for 30 minutes. The methanol excess was removed using a pipette. Solution B was then added to the treated $Al_2O_3$ and impregnated at room temperature overnight. The sample was then heated to about 40° C. until all the liquid evaporated.

(vi) The sample was then dried in a drying oven overnight, then placed in a muffle furnace and heat treated in air according to the following procedure:
1) Heated from room temperature to 120° C. at 3° C./min
2) Held at 120° C. for 2 hours
3) Heated from room temperature to 300° C. at 3° C./min
4) Held at 300° C. for 2 hours
5) Heated from room temperature to 500° C. at 1° C./min
6) Held at 500° C. for 2 hours (vii) After cooling to room temperature, the sample was taken out. The sample was then impregnated with a dilute HCl solution prepared by mixing 0.83 g of a 37% HCl solution and 24.2 g of water.

(viii) The sample was dried at room temperature for 2 hours, then heated to about 40° C. until all the liquid evaporated, and then dried in a drying oven for 3 hours. After cooling to room temperature the sample was weighed and packed in a bottle. The resulting catalyst had a weight composition of 0.34% Pt, 0.23% Sn, and 1.08% Cl.

Example 14

An Iron (III) solution was prepared by dissolving 2.32 g of $FeCl_3$ in 4 ml HCl and 996 ml de-ionized water to produce a 0.08 wt % solution of Fe (III). A Pt solution was prepared by dissolving 0.2614 g $H_2PtCl_6$ (from Strem Chemicals) in 1000 ml de-ionized water to make 0.01 wt % solution of Pt. To make a 6.75 wt % solution of polyacrylate, 15 g of a 45 wt % polyacrylate solution (Aldrich with MW ca. 1,200) was diluted to 100 grams with de-ionized water.

To prepare 2.4 grams of a 10% Fe and 0.2% Pt supported catalyst, 300 ml of the 0.08 wt % Fe solution was mixed with 48 ml of the 0.010 wt % Pt solution and 40 ml of the 6.75 wt % polyacrylate solution. The ratio of Fe:polyacrylate was 1:1. The solution was then diluted to 4000 ml with de-ionized water. This solution was purged with 100 ml/min $N_2$ for 1 h. The $N_2$ was then replaced with 130 ml/min $H_2$ for 16 minutes. The flask was then held overnight. The Fe—Pt solution resulted in a suspension of nanoparticles in a non-zero oxidation state.

24 g of Black Pearls 700 were impregnated by 4000 ml of the Fe—Pt solution. The slurry was heated by IR lamp under rotation until all the liquid was evaporated. That resulted in an intermediate catalyst composition comprising supported Fe—Pt nanoparticles in a non-zero oxidation state that was later reduced to the zero oxidation state.

Prior to reducing the supported Fe—Pt particles to the zero oxidation state, the intermediate catalyst composition is heated to one or more temperatures of 50° C. or greater for a time interval of 30 minutes or greater while maintaining at least a portion. of the Fe and Pt atoms in a non-zero oxidation state. The temperature(s) selected for the heat treatment process are one or more temperatures between 50° C. and 600° C. at 10° C. intervals (i.e., 50° C., 60° C., . . . 600° C.). The time interval selected for the heat treatment process is one between 30 minutes and 12 hours in 10 minute increments (i.e., 30 minutes, 40 minutes, . . . 12 hours).

By maintaining the catalyst atoms in a non-zero oxidation state during the heat treating process, the increased bond strength between the catalyst particles and the polyacrylate dispersing/anchoring agent would be expected to more firmly anchor the catalyst particles to the support, which in turn would be expected to better inhibit migration and/or agglomeration of the catalyst particles compared to catalyst particles that did not include catalyst atoms in a non-zero oxidation state attached to a support by a dispersing/anchoring agent.

The resulting supported catalyst can be used in a non-zero oxidation state, or it may be reduced to a zero (or ground) oxidation state before or during a desired catalytic process.

Example 15

8.13 g $FeCl_3$ was mixed with 16.5 g 70 wt % glycolic acid and diluted with water to 100 g. After overnight agitation, the $FeCl_3$ was totally dissolved. To this solution 2.8 g 0.01 wt % Pt solution from Example 1 was added. This solution was used to impregnate 140 g $CaCO_3$. After the same drying, activation, and support impregnation procedures as for Example 14, an intermediate catalyst composition comprising supported and alloyed catalyst nanoparticles comprising 2% Fe and 0.02% Pt was formed.

Prior to reducing the supported Fe—Pt particles to the zero oxidation state, the intermediate catalyst composition is heated to one or more temperatures of 50° C. or, greater for a time interval of 30 minutes or greater while maintaining at least a portion of the Fe and Pt atoms in a non-zero oxidation state. The temperature(s) selected for the heat treatment process are one or more temperatures between 50° C. and 600° C. at 10° C. intervals (i.e., 50° C., 60° C., . . . 600° C.). The time interval selected for the heat treatment process is one between 30 minutes and 12 hours in 10 minute increments (i.e., 30 minutes, 40 minutes, . . . 12 hours).

By maintaining the catalyst atoms in a non-zero oxidation state during the heat treating process, the increased bond strength between the catalyst particles and the polyacrylate dispersing/anchoring agent would be expected to more firmly anchor the catalyst particles to the support, which in turn would be expected to better inhibit migration and/or agglomeration of the catalyst particles compared to catalyst particles that did not include catalyst atoms in a non-zero oxidation state attached to a support by a dispersing/anchoring agent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of manufacturing a supported catalyst, comprising:
(i) providing a source of catalyst atoms;
(ii) providing a dispersing agent comprising a plurality of organic molecules that have at least one functional group capable of binding to the catalyst atoms;
(iii) reacting the dispersing agent with the catalyst atoms in the presence of a solvent to form a catalyst complex in the form of a solution, colloid and/or suspension within the solvent;
(iv) applying the catalyst complex together with the solvent or a later-added solvent to a support to yield an intermediate catalyst composition in which at least a portion of the plurality of catalyst atoms are in a non-zero oxidation state; and (v) heat treating the intermediate catalyst composition at a temperature of at least about 50° C. in an inert or oxidizing environment in order to maintain at least a portion of the catalyst atoms in the non-zero oxidation state, the method yielding the supported catalyst in which a plurality of nanocatalyst particles having a size less than about 100 nm are anchored to the support material.

2. A method as defined in claim 1, wherein (v) is carried out at a temperature in a range of about 100° C. to about 500° C.

3. A method as defined in claim 1, wherein (v) is carried out at a temperature in a range of about 140° C. to about 400° C.

4. A method as defined in claim 1, wherein (v) is carried out for a time period in a range of about 5 minutes to about 24 hours.

5. A method as defined in claim 1, wherein (v) is carried out for a time period in a range of about 1 hour to about 6 hours.

6. A method as defined in claim 1, wherein (v) comprises calcining the catalyst nanoparticles to remove volatile compounds.

7. A method as in claim 1, further comprising partially reducing the catalyst atoms from a higher oxidation state to a lower non-zero oxidation state prior to performing (v).

8. A method as in claim 7, wherein the catalyst atoms are partially reduced by exposing the intermediate catalyst composition to $H_2$ at a temperature below about 100° C.

9. A method as in claim 1, further comprising at least partially reducing the catalyst atoms from a higher oxidation state to a lower oxidation state subsequent to performing (v).

10. A method as in claim 1, wherein the support material is selected from the group consisting of carbon black, graphite, silica, alumina, zeolites, metal oxides, polymers, and combinations thereof.

11. A method as in claim 1, wherein the at least one functional group of the dispersing agent is selected from the group consisting of a hydroxyl, a carboxyl, a carbonyl, an amide, an amine, a thiol, a sulfonic acid, sulfonyl halide, an acyl halide, and combinations thereof.

12. A method as in claim 1, wherein the dispersing agent is selected from the group consisting of polyacrylic acid, polyacrylic acid salts, polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, and polypropylene glycol, ethanol, propanol, formic acid, acetic acid, oxalic acid, malonic acid, ethylene glycol, propylene glycol, glycolic acid, glucose, citric acid, glycine, alanine, ethanolamine, mercaptoethanol, 2-mercaptoacetate, sulfobenzyl alcohol, sulfobenzoic acid, sulfobenzyl thiol, sulfobenzyl amine, and combinations thereof.

13. A method as in claim 1, wherein at least a portion of the catalyst complex comprises an organometallic complex having the general formula:

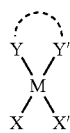

wherein:
a) X and X' are chosen independently of one another from the group comprising R, OR, OC(═O)R, halogens and combinations of these, where R stands for an alkyl or aryl group; and
b) Y and Y' are electron-donating atoms selected from the group consisting of O, N, P, S, and combinations of these.

14. A method as in claim 1, wherein the catalyst atoms comprise two or more different types of atoms that form alloyed, mixed, combined, decorated, or interspersed multicomponent nanocatalyst particles.

15. A method as in claim 14, wherein the catalyst atoms include a first component that is a noble metal and a second component that is at least one of a base transition metal, an alkaline earth metal, an alkali metal, or a non-metal.

16. A method as in claim 1, the method yielding the supported catalyst in which a plurality of nanocatalyst particles have a size less than about 10 nm anchored to the support material.

17. A method as in claim 1, the method yielding the supported catalyst in which a plurality of nanocatalyst particles have a size less than about 5 nm anchored to the support material.

18. A method as defined in claim 1, further comprising removing at least a portion of the solvent from the catalyst complex formed in (iii) to yield a dried catalyst complex material that is later reconstituted with one or more later added solvents prior to performing (iv).

19. A supported catalyst manufactured according to the method of claim 1.

20. A supported catalyst as defined in claim 19, wherein at least a portion of the catalyst atoms in the nanocatalyst particles are in a non-zero oxidation state.

21. A method of manufacturing a multicomponent catalyst, comprising:
(i) providing a source of catalyst atoms comprising a first type of catalyst atoms and a second type of catalyst atoms different from the first type;
(ii) providing a dispersing agent comprising a plurality of organic molecules that have at least one functional group capable of binding to the catalyst atoms and a second functional group capable of binding to a support material;
(iii) reacting the dispersing agent with the first and second types of catalyst atoms in the presence of a solvent to form a multicomponent catalyst complex in the form of a solution, colloid, and/or suspension within the solvent;
(iv) applying the multicomponent catalyst complex together with the solvent or later added solvent to a support to yield an intermediate catalyst composition in which the plurality of catalyst atoms are in a non-zero oxidation state; and
(v) heat treating the intermediate catalyst composition for at least about 5 minutes at a temperature of at least about 50° C. in an inert or oxidizing environment in order to maintain at least a portion of the catalyst atoms in the non-zero oxidation state, the method yielding the supported catalyst in which a plurality of nanocatalyst particles having a size less than about 100 nm are anchored to the support material and in which at least about 50% of the nanocatalyst particles include both the first and second types of catalyst atoms.

22. A multicomponent supported catalyst manufactured according to the method of claim 21.

23. A method of manufacturing a supported catalyst, comprising:

(i) providing a source of catalyst atoms;
(ii) providing a dispersing agent comprising a plurality of organic molecules that have at least one functional group capable of binding to the catalyst atoms;
(iii) reacting the dispersing agent with the catalyst atoms in the presence of a solvent to form a catalyst complex in the form of a solution. colloid, and/or suspension within the solvent;
(iv) applying the catalyst complex together with the solvent or later added solvent to a support to yield an intermediate catalyst composition in which at least a portion of the plurality of catalyst atoms are in a first non-zero oxidation state;
(v) partially reducing at least a portion of the catalyst atoms in the first non-zero oxidation state to a second non-zero oxidation state that is lower than the first non-zero oxidation state;
(vi) heat treating the intermediate catalyst composition at a temperature of at least about 50° C. in an inert or oxidizing environment in order to maintain at least a portion of the catalyst atoms in the non-zero oxidation state; and
(vii) reducing at least a portion of the catalyst atoms to a zero oxidation state, the method yielding the supported catalyst in which a plurality of nanocatalyst particles having a size less than about 100 nm are anchored to the support material.

24. A supported catalyst manufactured according to the method of claim 23.

* * * * *

UNITED STATES PATENT AND TRADEMARK OFFICE
CERTIFICATE OF CORRECTION

PATENT NO. : 7,449,423 B2
APPLICATION NO. : 11/101209
DATED : November 11, 2008
INVENTOR(S) : Zhou et al.

It is certified that error appears in the above-identified patent and that said Letters Patent is hereby corrected as shown below:

Column 3
Line 46, change "metal alloys" to --metal alloys.--

Column 7
Line 40, change "catalyst atoms. complexed" to --catalyst atoms complexed--

Column 8
Line 10, change "organometallic complex. can" to --organometallic complex can--

Column 14
Line 63, change "the inventive was" to --the invention was--

Column 18
Line 21, change "3-hourr" to --3-hours--

Column 24
Line 18, change "water and, acetone," to --water and acetone,--

Column 25
Line 61, change "a portion. of the Fe" to --a portion of the Fe--

Column 29
Line 7, change "of a solution. colloid, and/or" to --of a solution, colloid, and/or--

Signed and Sealed this

Eighteenth Day of August, 2009

David J. Kappos
*Director of the United States Patent and Trademark Office*